Patented July 29, 1924.

1,503,430

UNITED STATES PATENT OFFICE.

WILLIAM FRASER RUSSELL, OF NORWALK, CONNECTICUT, ASSIGNOR TO THE NORWALK TIRE & RUBBER COMPANY, OF NORWALK, CONNECTICUT, A CORPORATION OF CONNECTICUT.

ART OF VULCANIZING RUBBER.

No Drawing. Application filed June 21, 1922. Serial No. 569,935.

*To all whom it may concern:*

Be it known that I, WILLIAM FRASER RUSSELL, a subject of the King of England, residing at Norwalk, in the county of Fairfield, State of Connecticut, have invented certain new and useful Improvements in the Art of Vulcanizing Rubber; and I do hereby declare the following to be a full, clear, and exact description of the invention, such as will enable others skilled in the art to which it appertains to make and use the same.

This invention relates to improvements in the vulcanization of certain types of rubber.

When urea is added to mixtures of pure rubber and sulphur, or to rubber-sulphur mixtures containing inert pigments or fillers, it possesses the property of accelerating the vulcanization of such mixtures to a considerable degree. This acceleration appears to be independent of the type or nature of the raw rubber, and good results may be obtained with any reasonably good type of rubber when urea is used as an accelerator.

When, however, zinc oxide is used together with sulphur in the rubber mixings, the conditions are entirely different, and I have found great differences in the effect of urea when used with such mixtures. I have found that, with certain types of rubber, the accelerating action of the urea is very materially reduced when zinc oxide is present, while, with other types, the accelerating effect of the urea with zinc oxide present is very much increased.

Accordingly, while urea is a valuable accelerator and of general application with rubber-sulphur mixtures, and mixtures also containing inert pigments or fillers, the results obtained are variable in character when zinc oxide is also present. This variability in results has led me to investigate and discover the conditions under which the best product can be uniformly obtained. As a result of my investigations I have found that the reaction of the zinc oxide with the raw rubber varies during vulcanization, and that the variable results obtained are due to variations in the raw rubber. In short with certain types of raw rubber when using urea as an accelerator better results can be obtained by the addition of zinc oxide than with other types of raw rubber.

For example, I have found that when a small amount of zinc oxide, say 3% more or less, of the weight of the rubber is employed together with sulphur in the vulcanization of rubber, certain types of rubber respond to or are physically improved by the zinc oxide; while other types of rubber are unresponsive to and are not improved or benefited by the zinc oxide. Preliminary vulcanization tests, using, for example, 10% of sulfur based on the rubber and using in one case 3% of zinc oxide and in another omitting the zinc oxide will show whether the rubber is of a type which is responsive to and physically improved by the zinc oxide or not. I have also found that, with those types of rubber which respond to or are improved by zinc oxide during vulcanization, a considerable amount of the zinc oxide disappears or becomes dissolved in the rubber during the process of vulcanization, in fact I might almost say acts as an auxiliary vulcanizing agent, and that the improved physical quality of the vulcanizate is largely due to this combination of zinc oxide in some manner with the sulphurized rubber. This remarkable dissolution of zinc oxide does not take place to an appreciable extent in those rubbers which are not responsive to or physically improved by zinc oxide. The vulcanization of the different types of rubber, accordingly, partakes of a different nature with those types which respond to or are improved by zinc oxide than it does in the case of those types of rubber which do not so respond or are not so improved.

I have further found that, with those types of rubber which are responsive to zinc oxide, the urea not only acts as a very powerful accelerator but promotes and accelerates the dissolution of the zinc oxide in the rubber, thus giving vulcanized products of greatly enhanced physical strength.

The present invention accordingly is realized by adding zinc oxide and urea to those types of rubber which respond to or are improved by zinc oxide during vulcanization, and I have found that with such types of rubber, an exceedingly efficient and powerful effect and strong well-vulcanized products can be obtained in a short time even with very small quantities of zinc oxide and urea. Under such conditions, and with such mixtures, the urea seems to act in such a way as to augment or intensify the action of the zinc oxide upon the rubber as well as the action of other accelerators.

In addition to urea, certain derivatives of urea such as alkyl ureas, may also be used in a similar manner These substances are non-poisonous and have a great advantage over the majority of organic accelerators in use today, practically all of which are of a very poisonous character.

In the practice of my invention the urea may be used in the pure state or it may also be applied in the technical or impure form. Solutions of urea, particularly that in water, are very advantageous. For example, the pure or impure urea liquors obtained in the manufacture of urea are particularly suitable. In such cases the solvent evaporates during the compounding while the solution is being introduced on the mixing mill.

The invention is not limited to the vulcanizing of mixtures of rubber responsive to zinc oxide, with sulphur, zinc oxide, and urea alone, inasmuch as other suitable filling or compounding ingredients may be added to the mixtures provided the added substances do not interfere with the reaction of the zinc oxide, sulphur and urea on the rubber during its vulcanization.

The radical improvement which the present invention enables to be secured will be evident from the following examples.

*Example 1.*—The rubber used in the different compounds was one which was responsive to zinc oxide. Three compounds were made as follows:

| Compound 1. | Compound 2. | Compound 3. |
|---|---|---|
| Rubber......... 100 | Rubber......... 100 | Rubber......... 100 |
| Sulfur......... 5 | Zinc oxide..... 3 | Zinc ox......... 3 |
|  | Sulfur......... 5 | Sulfur......... 5 |
|  |  | Urea........... 0.5 |

These mixtures were cured for different periods of time in a vulcanizing press at a temperature of 148° C. and the cured products were tested in the ordinary way on a Scott tester. In the following table the tensil strength and elongation at break of the different cures are given. The results indicated under the heading "Compound 1" show the behavior of a rubber which is normally responsive to zinc oxide but which was cured with sulfur alone. The results indicated under the heading "Compound 2" show the effect of adding 3% of zinc oxide to compound 1 without the addition of urea. The responsiveness of the rubber to zinc oxide is indicated by a decided enhancement of physical strength.

The results indicated under the heading "Compound 3" show the effect of adding one-half per cent of urea to Compound 2. A great acceleration of the cure and an enormous improvement of the physical quality of the product takes place. The results obtained with the three compounds are as follows:

| Time of cure. | Compound #1. | | Compound #2. | | Compound #3. | |
|---|---|---|---|---|---|---|
|  | Tensile strength. | Elongation at break. | Tensile strength. | Elongation at break. | Tensile strength. | Elongation at break. |
| Min. | Lb. sq. in. | Per cent. | Lb. sq. in. | Per cent. | Lb. sq. in. | Per cent. |
| 30 | 371 | 930 | 665 | 860 | 1792 | 800 |
| 45 | 689 | 940 | 990 | 850 | 2406 | 800 |
| 60 | 981 | 940 | 1188 | 850 | 2816 | 790 |
| 75 | 1166 | 950 | 1280 | 840 | 2457 | 750 |
| 90 | 1378 | 955 | 1484 | 840 | 2304 | 750 |
| 120 | 1696 | 955 | 1843 | 840 |  |  |
| 180 | 1961 | 910 | 2176 | 850 |  |  |

*Example 2.*—The following example illustrates a compound suitable for red inner tubes for automobile tires, and shows the results obtained with and without the use of urea. The rubber was one which was responsive to zinc oxide:

|  | Compound #1 | Compound #2 |
|---|---|---|
| Rubber | 100 | 100 |
| Zinc ox. | 4 | 4 |
| Crimson sulfide of antimony | 3 | 3 |
| Sulfur | 2.65 | 2.65 |
| 41% aqueous urea |  | 2.44 |

| Time of cure. | Compound 1—Without urea. | | Compound 2—With urea. | |
|---|---|---|---|---|
|  | Tensile strength. | Elongation and break. | Tensile strength. | Elongation and break. |
| Min. | Lb. sq. in. | Per cent. | Lb. sq. in. | Per cent. |
| 30 | 106 | 750 | 1219 | 830 |
| 45 | 256 | 780 | 2201 | 840 |
| 60 | 420 | 840 | 2611 | 850 |
| 75 | 583 | 850 | 2764 | 850 |
| 90 | 901 | 860 | 2467 | 850 |
| 120 | 945 | 850 |  |  |
| 180 | 1075 | 850 |  |  |

It will be seen from the results obtained without the use of urea that the formula will not yield a product of any value no matter how long the cure may be prolonged. When urea is added to the formula, however, a valuable product is obtained in from 45-60 minutes' time.

*Example 3.*—The following example illustrates a white soft rubber product suitable for technical purposes, with and without urea, but with zinc oxide added in each case.

|  | Compound 1. | Compound 2. |
|---|---|---|
| Rubber | 100 | 100 |
| Zinc ox. | 25 | 25 |
| Lithopone | 50 | 50 |
| Sulfur | 5 | 5 |
| Urea |  | 0.5 |

| Time of cure. | Compound 1—Without urea. | | Compound 2—With urea. | |
|---|---|---|---|---|
|  | Tensile strength. | Elongation and break. | Tensile strength. | Elongation and break. |
| Min. | Lb. sq. in. | Per cent. | Lb. sq. in. | Per cent. |
| 30 | 735 | 650 | 1843 | 650 |
| 45 | 1113 | 650 | 2491 | 670 |
| 60 | 1177 | 630 | 2367 | 680 |
| 75 | 1272 | 650 | 2467 | 650 |
| 90 | 1433 | 660 | 2385 | 650 |
| 120 | 2014 | 670 |  |  |
| 180 | 2099 | 700 |  |  |

Whereas the compound made without urea required from two to three hours to reach a mediocre strength, the addition of one-half of one percent of urea caused it to cure to a valuable product of high strength in from 45–60 minutes.

The amount of urea added in the practice of the invention may vary from a fraction of one percent to several percent, according to the effect desired. The zinc oxide may also be varied over a wide range, from a fraction to one percent, up.

The advantages which the present invention presents in the improvement of the vulcanization of certain types of rubber will be evident from the foregoing examples.

In certain of the accompanying claims I use the term "non-toxic urea compounds" to include urea itself and simple non-toxic derivatives thereof such as the alkyl ureas.

I claim:

1. The method of improving the vulcanization of rubber which is normally responsive to zinc oxide, which comprises mixing the rubber with zinc oxide, a non-toxic urea compound and sulfur, and vulcanizing the resulting mixture.

2. The method of improving the vulcanization of rubber which comprises subjecting the rubber to preliminary test by vulcanization with and without zinc oxide, and subjecting rubber which is thus shown to be responsive to zinc oxide to vulcanization in admixture with zinc oxide, sulfur and a urea compound.

3. The method which consists in adding zinc oxide, sulfur and urea to a rubber responsive to zinc oxide and vulcanizing the resulting mixture.

4. The method of improving the vulcanization of rubber which comprises subjecting the rubber to preliminary vulcanization tests with and without zinc oxide, and subjecting rubber which upon such test is shown to be responsive to zinc oxide, to vulcanization in admixture with zinc oxide, sulfur and urea.

5. Vulcanized rubber products comprising rubber normally responsive to zinc oxide vulcanized in admixture with sulfur, zinc oxide and a non-toxic urea compound, said products containing zinc oxide in a state of dissolution therein.

6. Vulcanized rubber products comprising rubber normally responsive to zinc oxide vulcanized in admixture with sulfur, zinc oxide and urea, said products containing zinc oxide in a state of dissolution therein.

In testimony whereof I affix my signature.

WILLIAM FRASER RUSSELL.